United States Patent
Rudman et al.

(10) Patent No.: US 7,349,170 B1
(45) Date of Patent: Mar. 25, 2008

(54) METHOD OF MONITORING OPERATION OF A DISK DRIVE BY ANALYZING THE ENVELOPE OF A READ-BACK SIGNAL IN THE FREQUENCY DOMAIN

(75) Inventors: Victor Rudman, Santa Clara, CA (US); Jagdeep S. Buttar, Fremont, CA (US); Yogesh P. Kharady, Fremont, CA (US); Tao Pan, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 11/414,569

(22) Filed: Apr. 28, 2006

(51) Int. Cl.
*G11B 21/02* (2006.01)
*G11B 27/36* (2006.01)

(52) U.S. Cl. .......................... 360/75; 360/31
(58) Field of Classification Search .............. None
See application file for complete search history.

(56) References Cited

U.S. PATENT DOCUMENTS

| | | | |
|---|---|---|---|
| 4,777,544 A | 10/1988 | Brown et al. | |
| 5,130,866 A | 7/1992 | Klaasen et al. | |
| 5,410,439 A | 4/1995 | Egbert et al. | |
| 5,594,595 A | 1/1997 | Zhu | |
| 5,784,296 A * | 7/1998 | Baker et al. | 702/76 |
| 5,901,001 A * | 5/1999 | Meyer et al. | 360/25 |
| 5,991,113 A * | 11/1999 | Meyer et al. | 360/75 |
| 6,008,640 A | 12/1999 | Tan et al. | |
| 6,100,683 A | 8/2000 | Lim et al. | |
| 6,407,874 B1 * | 6/2002 | Smith et al. | 360/25 |
| 6,570,730 B1 * | 5/2003 | Lewis et al. | 360/75 |
| 6,665,134 B2 * | 12/2003 | Ottesen et al. | 360/31 |
| 6,674,590 B2 * | 1/2004 | Ottesen et al. | 360/31 |
| 6,785,081 B2 | 8/2004 | Chapin et al. | |
| 6,801,376 B2 | 10/2004 | Smith | |
| 6,967,805 B1 * | 11/2005 | Hanchi et al. | 360/75 |

OTHER PUBLICATIONS

Run-Han Wang et al., "Head-Disk Dynamics in the Flying, Near Contact, and Contact Regimes," Journal of Tribology, vol. 123, Issue 3, Jul. 2001, pp.561-565.

* cited by examiner

*Primary Examiner*—K. Wong
(74) *Attorney, Agent, or Firm*—Jonathan E. Prejean, Esq.; Knobbe, Martens, Olson & Bear

(57) ABSTRACT

A method monitors operation of a disk drive. The method includes providing a disk drive which includes a rotating disk and a head having a read transducer in proximity to a surface of the disk and an adjustment mechanism which controllably adjusts an average relative spacing between the read transducer and the surface. The method further includes generating a read-back signal by reading from the surface using the read transducer. The read-back signal includes a high frequency carrier signal having an envelope that is modulated by a lower frequency signal. The method further includes varying the average relative spacing between the read transducer and the surface using the adjustment mechanism. The method further includes analyzing the envelope in the frequency domain and detecting an emergence of at least one frequency component of the envelope within an air bearing resonance range of frequencies.

17 Claims, 8 Drawing Sheets

METHOD OF MONITORING OPERATION OF A DISK DRIVE BY ANALYZING THE ENVELOPE OF A READ-BACK SIGNAL IN THE FREQUENCY DOMAIN

BACKGROUND OF THE INVENTION

1. Field of the Invention

This invention relates generally to disk drives, and more particularly, to methods of monitoring the operation of disk drives.

2. Description of the Related Art

Disk drives (e.g., hard disk drives) typically utilize a plurality of heads in proximity to magnetic media on a plurality of rotating disks. Each head has a read transducer for reading data from the magnetic media. Each head may also have a write transducer including a pole tip for writing data to the magnetic media.

Generally, higher data storage densities on the magnetic media are obtained by having the read and write transducers close to the magnetic media without touching the magnetic media. The distance between the rotating disk and one or both transducers (referred to as the "flying height" of the head) is typically quite small (e.g., less than one microinch). It is desirable to maintain the flying height at a predetermined level while avoiding contact between the head and the rotating disk. For example, dynamic flying height (DFH) disk drives use an internal heater to heat the head to control protrusion by thermal expansion of or around the transducers (and hence the flying height) of each head. In this way, the desired head-media spacing for each head in the whole population of heads can be maintained.

Various techniques have been used previously to monitor or detect the flying height of the head over the rotating disk. In "Head-Disk Dynamics in the Flying, Near Contact, and Contact Regimes," *J. Tribology*, July 2001, Vol. 123, Issue 3, pages 561-565, R.-H. Wang et al. describes the dynamics of flying near contact, explaining that there is an increase in the spacing modulation as the head gets closer to the rotating disk. As the head gets closer to the disk, the air bearing and the slider begin to resonate at certain frequencies. These vibrations cause variations in the spacing between the head and the magnetic media that result in modulation of the signal read from the magnetic media by the read transducer (referred to as the read-back signal). Wang et al. also discloses measuring the spacing modulation using a laser Doppler vibrometer (LDV) which measures motion of the head by analyzing laser light reflected from the head. Analysis of the read-back signal based on the Wallace equation to measure head/media clearance has also been described by U.S. Pat. Nos. 4,777,544 and 5,130,866. Detection of contact between the head and the rotating disk by analyzing frequency jitter in the read-back signal due to mechanical vibrations of the head along the direction of the track (which is parallel to the rotating disk surface) has been described by U.S. Pat. No. 5,594,595.

Laser doppler vibrometry typically utilizes relatively expensive equipment and requires that the disk drive be opened sufficiently to allow a laser beam to reflect from the head. Each of these factors makes laser doppler vibrometry inconvenient for production-line characterization of disk drives. In addition, analysis of the read-back signal to detect frequency modulation would be difficult for a digital system since the carrier frequency of the read-back signal is in the range of hundreds of MHz and such high sampling rates would be required.

SUMMARY OF THE INVENTION

In certain embodiments, a method monitors operation of a disk drive. The method comprises providing a disk drive comprising a rotating disk and a head having a read transducer in proximity to a surface of the disk and an adjustment mechanism which controllably adjusts an average relative spacing between the read transducer and the surface. The method further comprises generating a read-back signal by reading from the surface using the read transducer. The read-back signal comprises a high frequency carrier signal having an envelope that is modulated by a lower frequency signal. The method further comprises varying the average relative spacing between the read transducer and the surface using the adjustment mechanism. The method further comprises analyzing the envelope in the frequency domain and detecting an emergence of at least one frequency component of the envelope within an air bearing resonance range of frequencies.

DETAILED DESCRIPTION OF THE PREFERRED EMBODIMENT

Figure 1:
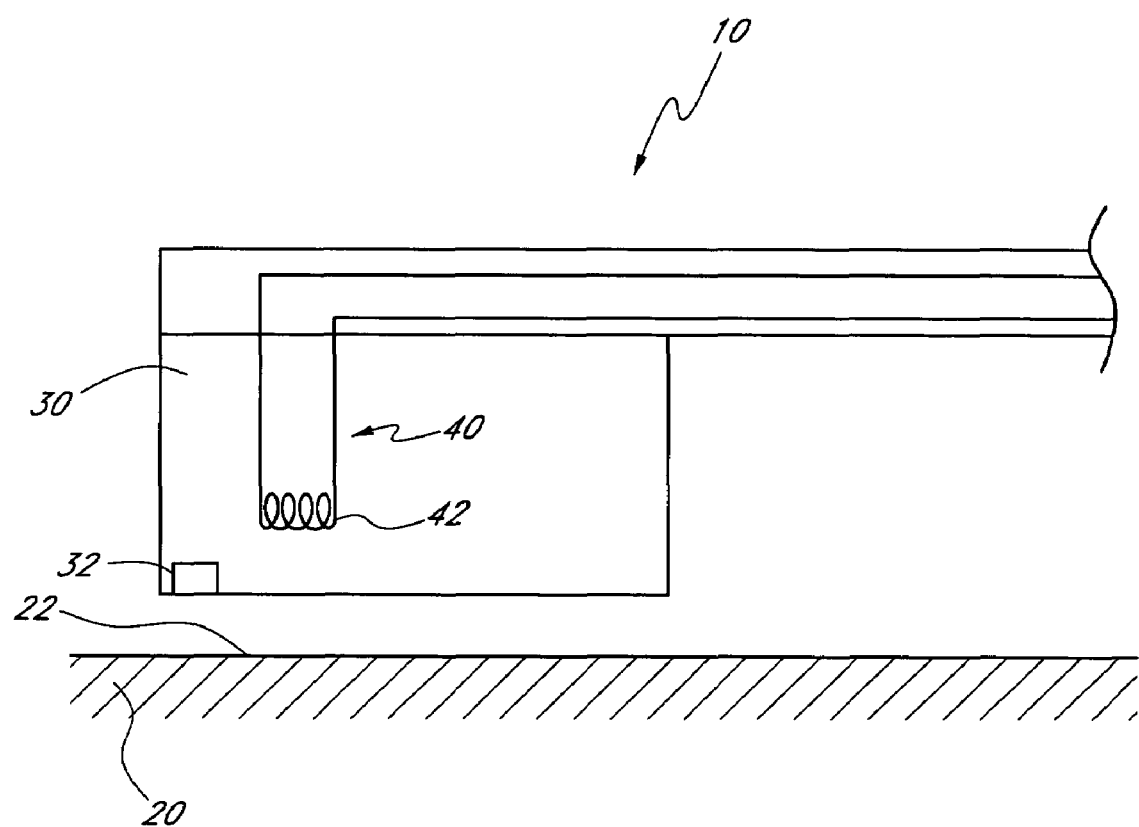
FIG. 1 schematically illustrates an example disk drive compatible with certain embodiments described herein.
Figure 2:
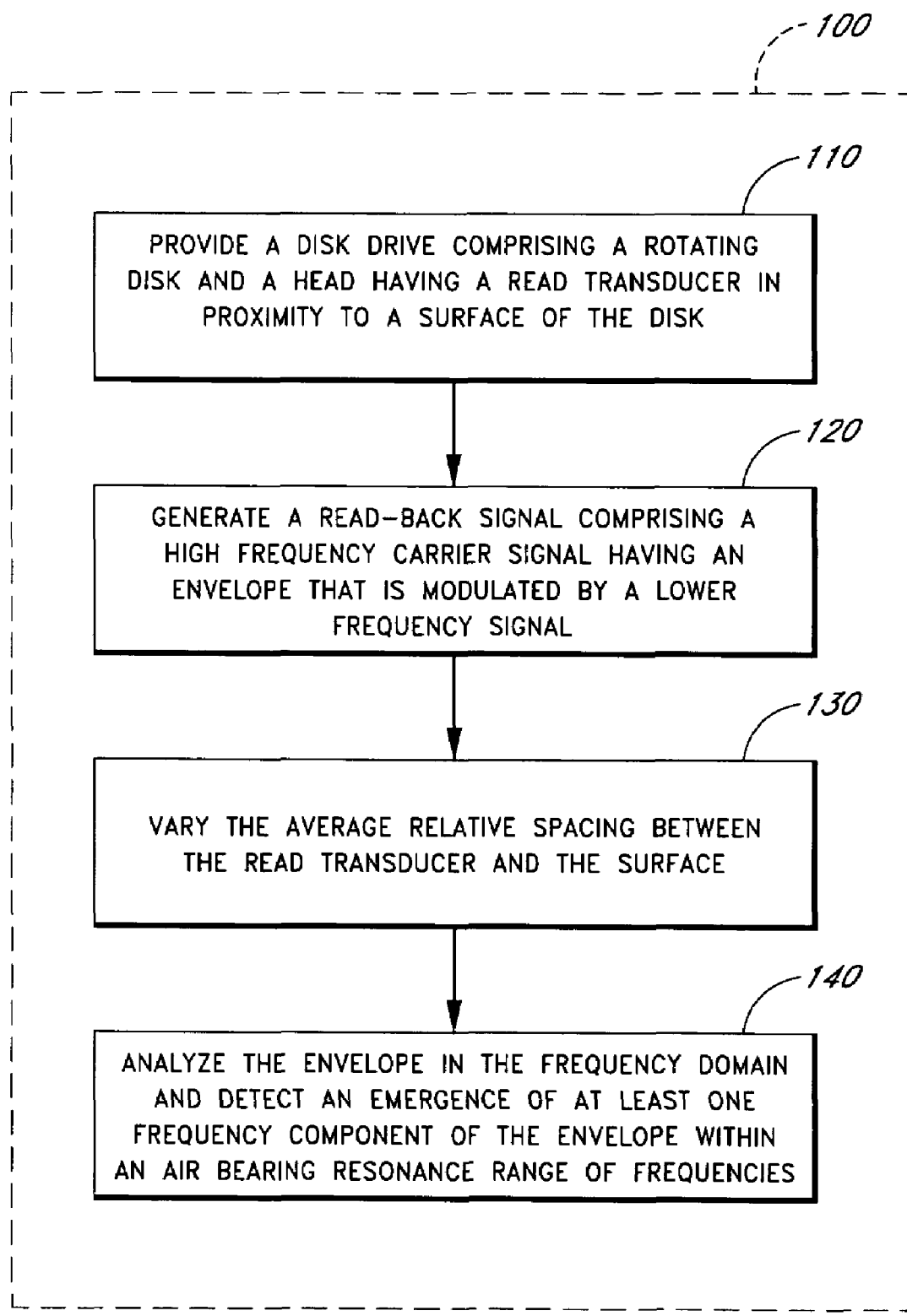
FIG. 2 is a flow diagram of an example method of monitoring operation of a disk drive in accordance with certain embodiments described herein.

FIG. 1 schematically illustrates an example disk drive 10 compatible with certain embodiments described herein. FIG. 2 is a flow diagram of an example method 100 of monitoring operation of the disk drive 10 in accordance with certain embodiments described herein. While FIG. 2 and the following description refer to structures shown schematically in FIG. 1, other structures or configurations of the disk drive are also compatible with certain embodiments described herein.

In certain embodiments, the method 100 comprises providing a disk drive 10, as shown in the operational block 110 of FIG. 2. The disk drive 10 comprises a rotating disk 20 and a head 30 having a read transducer 32 in proximity to a surface 22 of the disk 20. The disk drive 10 further comprises an adjustment mechanism 40 which controllably adjusts an average relative spacing between the read transducer 32 and the surface 22. The read transducer 32 of certain embodiments is part of the head 30 which is proximal to the surface 22. In certain embodiments in which the disk drive 10 is a dynamic-flying-height (DFH) disk drive, the adjustment mechanism 40 comprises a resistive heating element or heater 42 configured to heat at least a portion of the head 30 (e.g., the pole tip of the head 30), the portion having a non-zero coefficient of thermal expansion. The heated portion of the head 30 then protrudes towards the surface 22 of the disk 20 in response to the heat from the heater 42 according to the thermal coefficient of expansion of the heated portion of the head 30. By selectively heating the portion of the head 30 and selectively allowing the portion of the head 30 to cool, the flying height of the head 30 can be controlled. Examples of disk drives compatible with certain embodiments described herein include, but are not limited to, ML60 and GL125.

Figure 3:
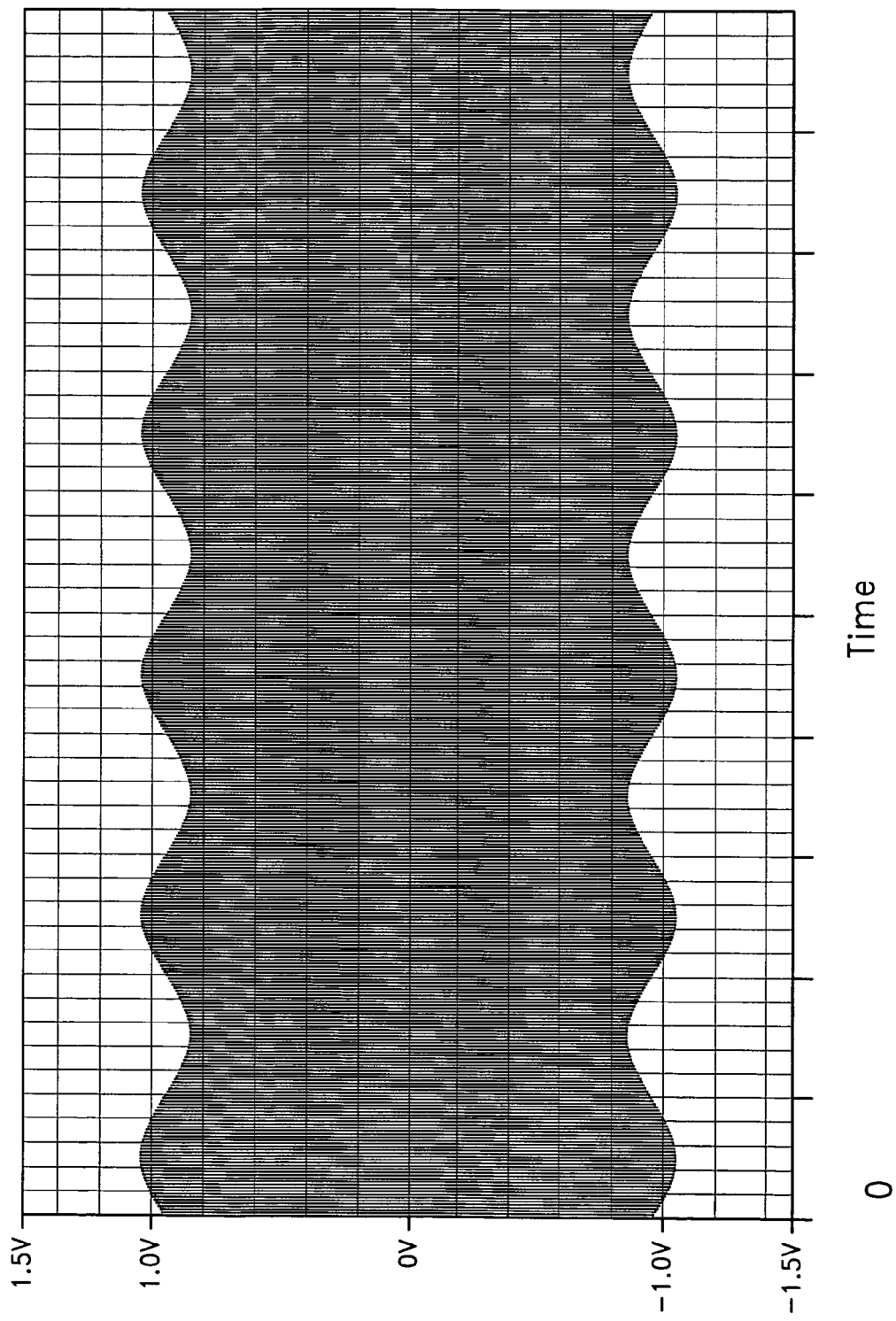
FIG. 3 is a simulation of a time-domain graph of an example read-back signal compatible with certain embodiments described herein.

In certain embodiments, the method 100 further comprises generating a read-back signal by reading from the surface 22 using the read transducer 32, as shown in the operational block 120 of FIG. 2. The read-back signal comprises a high frequency carrier signal having an envelope that is modulated by a lower frequency signal. In certain embodiments, the read-back signal is generated by reading from a region of the surface 22 upon which a constant frequency test pattern has previously been written. FIG. 3 is a simulation of a time-domain graph of an example read-back signal compatible with certain embodiments described herein. The high frequency carrier signal of FIG. 3 has a frequency of about 126 MHz and the envelope is modulated by a signal having a frequency of about 200 kHz. Other frequencies for the carrier signal and the envelope are also compatible with certain embodiments described herein.

The read-back signal is indicative of the mechanical vibrations experienced by the head 30 as the read transducer 32 reads from the surface 22 to produce the read-back signal. Vibrations of the head 30 along the direction of disk rotation (a longitudinal direction parallel to the surface 22) cause variations in the timing at which magnetic flux transitions of the surface 22 are read by the read transducer 32, thereby causing frequency modulation of the read-back signal. Vibrations of the head 30 along a direction perpendicular to the surface 22 cause variations in the instantaneous flying height of the head 30, thereby causing amplitude modulation of the read-back signal. This amplitude modulation is reflected in the envelope of the read-back signal, so the envelope is indicative of vibrations of the head 30 that have a component in a generally perpendicular direction relative to the rotating disk 20.

Figure 4:
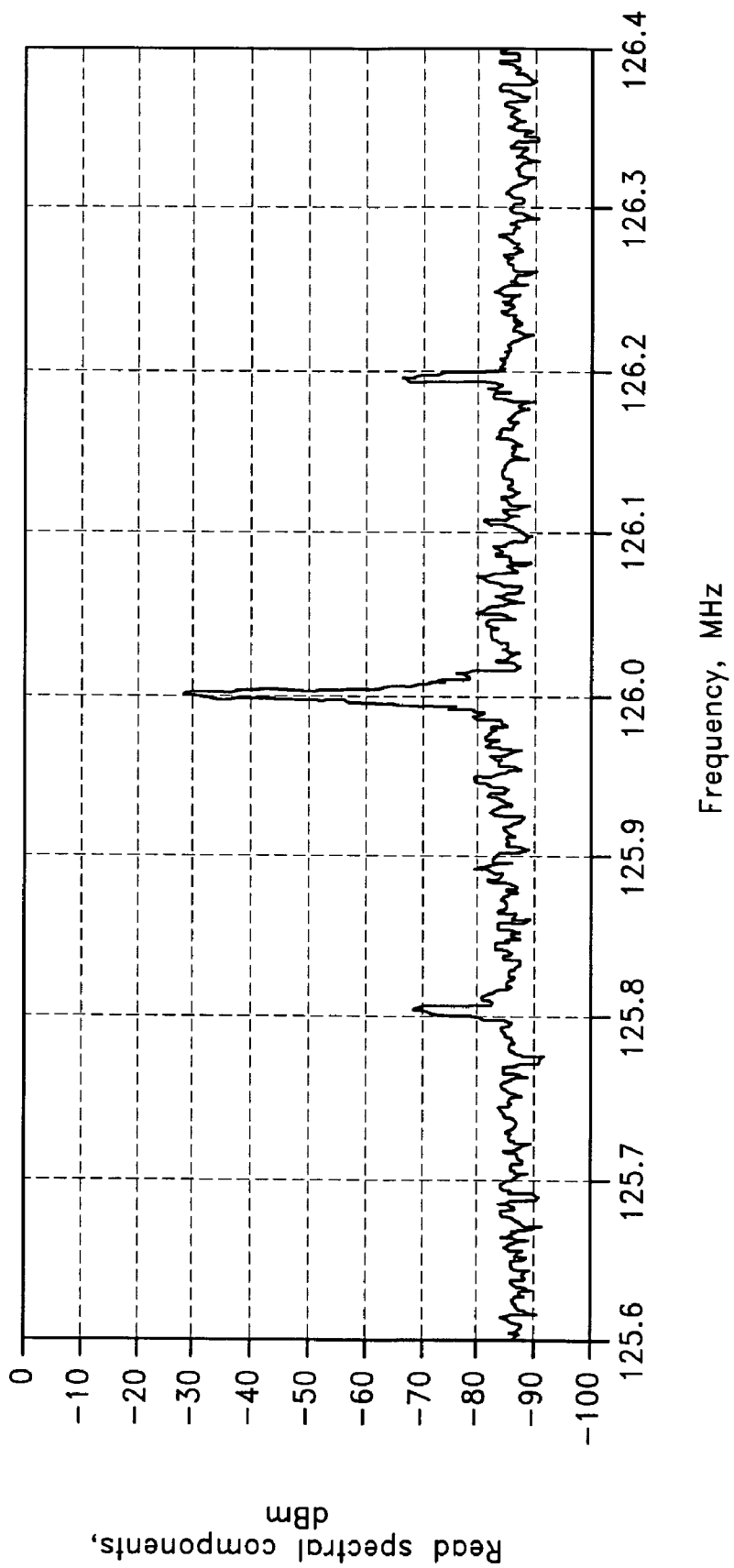
FIG. 4 is a frequency-domain graph of an example read-back signal.

FIG. 4 is a frequency-domain graph of an example read-back signal. The large peak at about 126 MHz corresponds to the frequency of the carrier signal of the read-back signal. The two smaller side harmonic peaks at about 125.8 MHz and about 126.2 MHz are spaced from the large peak by about ±200 kHz which corresponds to the frequency of the envelope modulation. The signal level of the modulation shown in FIG. 4 is about −37 dB while the integral noise level is about −18 dB. The frequency of this envelope modulation is within an air bearing resonance range of frequencies corresponding to vibrations of the air bearing (e.g., between about 50 kHz and about 500 kHz).

In certain embodiments, the method 100 further comprises varying the average relative spacing between the read transducer 32 and the surface 22 using the adjustment mechanism 40. The average relative spacing is varied in certain embodiments in which the disk drive 10 is a DFH drive by selectively heating at least a portion of the head 30 and selectively allowing the portion of the head 30 to cool, thereby controlling the flying height of the head 30 via the thermal expansion of the portion of the head 30.

In certain embodiments, the method 100 further comprises analyzing the envelope in the frequency domain and detecting an emergence of at least one frequency component of the envelope within an air bearing resonance range of frequencies. This analysis of the envelope is in contrast to previous techniques (e.g., as disclosed in U.S. Pat. Nos. 6,008,640, 6,100,683) in which frequency modulation of the read-back signal was analyzed to detect head-disk contact.

In certain embodiments, analyzing the envelope in the frequency domain comprises calculating a Fourier transform of the envelope. In certain embodiments, the Fourier transform is calculated by software, while in other embodiments, the Fourier transform is calculated by hardware.

In certain embodiments, analyzing the envelope in the frequency domain comprises using a spectrum analyzer. In certain embodiments, operation of the disk drive is monitored on a spinstand (e.g., a commercially available spinstand) that is also used for dynamic electrical testing of the head 30 and the read transducer 32. In certain embodiments, the operation of the disk drive is monitored in situ within a disk drive that has been at least partially assembled.

Figure 5:
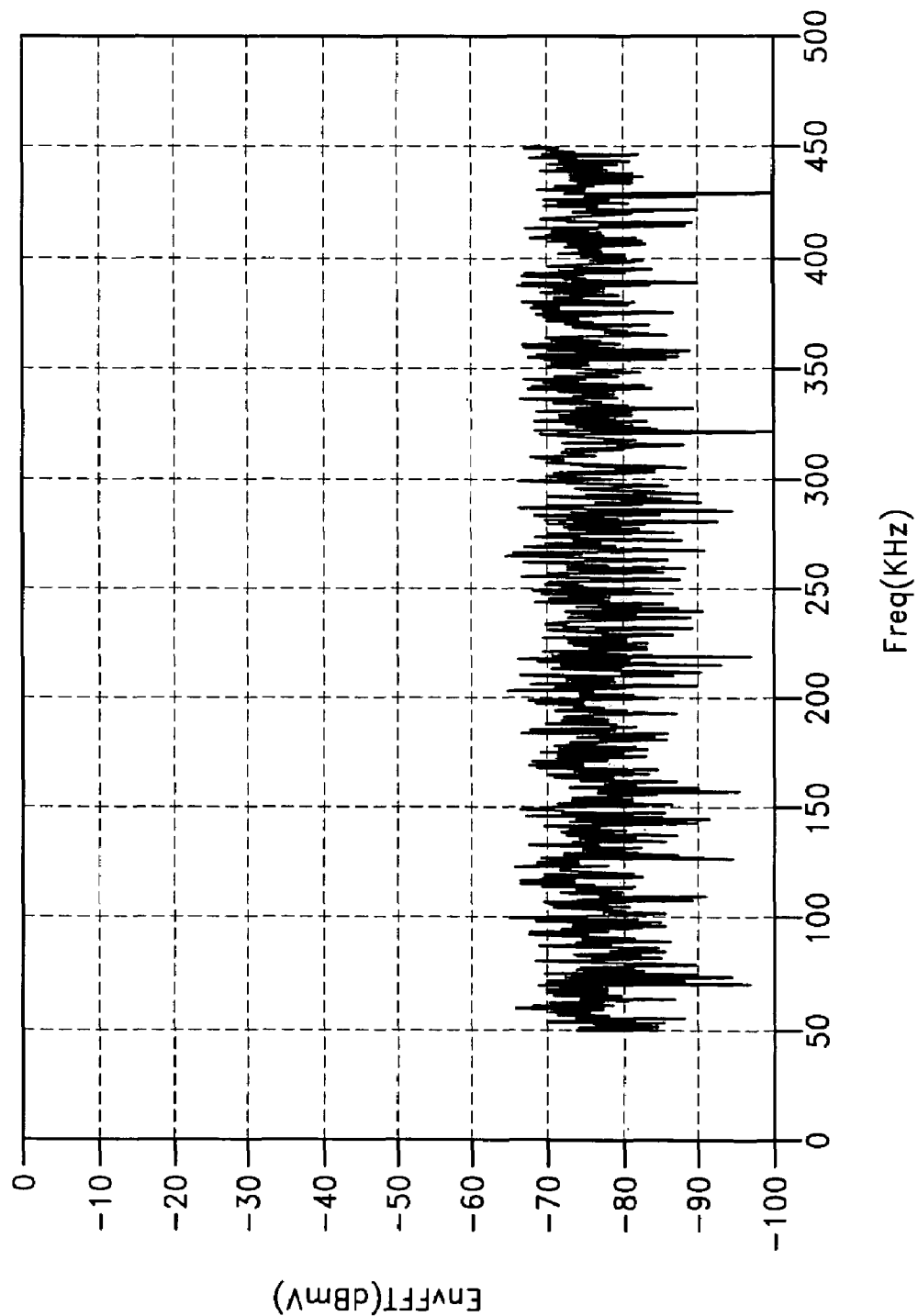
FIG. 5 illustrates the fast Fourier transform (FFT) of the measured envelope signal without frequency components above the noise level within the air bearing resonance range of frequencies.

FIG. 5 illustrates the fast Fourier transform (FFT) of the measured envelope signal without frequency components above the noise level within the air bearing resonance range of frequencies. In certain embodiments, the measured envelope signal is generally unchanging for heater voltages up to about 4.7 volts, which is indicative of a lack of air bearing resonances due to proximity of the head 30 to the rotating disk 20 prior to contact between the head 30 and the disk 20.

Figure 6:
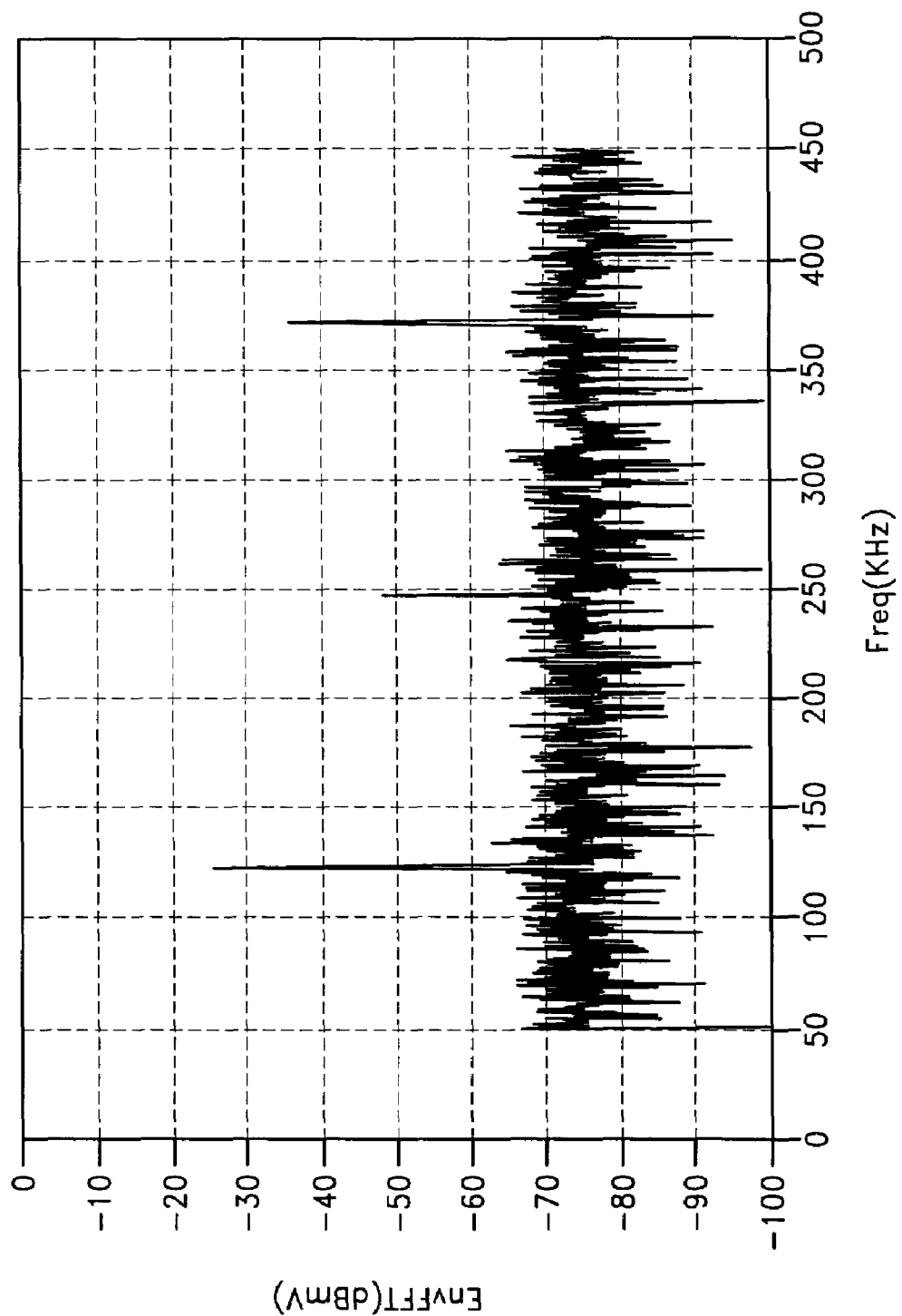
FIG. 6 illustrates the FFT of a measured envelope signal with frequency components above the noise level within the air bearing resonance range of frequencies.

FIG. 6 illustrates the FFT of a measured envelope signal with frequency components above the noise level within the air bearing resonance range of frequencies for a heater voltage of about 4.8 volts. As shown in FIG. 6, in certain embodiments, these frequency components are at about 125 kHz and its harmonics. In certain embodiments, the emergence of these frequency components occurs for heater voltages greater than about 4.7 volts due to the proximity of the head 30 to the rotating disk 20, prior to contact between the head 30 and the rotating disk 20. Therefore, the emergence of the frequency components is indicative of near-contact between the rotating disk 20 and the head 30 (sometimes termed "pre-touchdown"). For the head 30 corresponding to the measurements shown in FIG. 6, contact has not yet occurred for heater voltages up to about 4.8 volts. Certain embodiments described herein advantageously provide a high sensitivity to the flying height and can detect vibrations with amplitudes as low as about 0.2 nanometer. Results obtained from three runs, each run having three iterations in which the flying height was decreased by increasing the heater voltage indicate a good repeatability of the measurements.

In certain embodiments, emergence corresponds to an amplitude of the at least one frequency component above a noise level in the frequency domain with decreasing flying height. In certain embodiments, emergence of the frequency component is defined to correspond to a predetermined amplitude above the noise level in the frequency domain (e.g., between approximately 10 dB and approximately 20 dB above the noise level in the frequency domain).

In certain embodiments, the method 100 further comprises avoiding contact between the rotating disk 20 and the head 30. Emergence of the at least one frequency component of the envelope within the air bearing resonance range of frequencies in certain embodiments corresponds to near-contact between the rotating disk 20 and the head 30 prior to actual contact between the rotating disk 20 and the head 30. In certain such embodiments, the emergence of the frequency component is detected prior to contact between the rotating disk 20 and the head 30. In this way, the method 100 of certain embodiments further comprises using the emergence to avoid contact between the rotating disk 20 and the head 30. While the at least one frequency component immerges in the air bearing resonance range of frequencies, the actual frequency of the immerging at least one frequency component is sample- or product-dependent. In addition, in certain embodiments, the heater voltage corresponding to emergence of the at least one frequency component is sample- or product-dependent. In certain embodiments, once the heater voltage corresponding to near-contact is determined for a disk drive 10, subsequent operation of the disk drive 10 never utilizes a heater voltage larger than the heater voltage corresponding to near-contact. In certain embodiments, the heater voltage is constrained to values for which the flying height is approximately 2 to 3 nanometers larger than the flying height corresponding to near-contact.

For example, the emergence of at least one frequency component corresponding to an air bearing resonance is monitored as a function of the heater voltage applied to the heater of the head 30, and the magnitude of the heater voltage corresponding to emergence of at least one frequency component of the envelope is determined. Thereafter, the heater voltage for the head 30 is selected or otherwise constrained to be below the magnitude corresponding to emergence, thereby avoiding contact between the rotating disk 20 and the head 30. In certain embodiments, contact between the rotating disk 20 and the head 30 is avoided on a spinstand that is also used for dynamic electrical testing of the disk drive 10. In certain other embodiments, contact between the rotating disk 20 and the head 30 is avoided during subsequent use of the head 30 by the end-user of the disk drive 10.

In certain embodiments, the proximity of the head 30 to the rotating disk 20 can be detected before any hard contact occurs between the head 30 and the rotating disk 20. Since the amplitude of the envelope modulations due to the vibrations of the head 30 (e.g., approximately 1% to 2% of the signal level) are comparable or less than the noise amplitude, it is generally not possible to detect these modulations in the time domain unless there is a large change due to hard contact or touchdown, which can result in damage to the head 30 or the rotating disk 20. However, the modulations in the frequency domain are typically more than 10 dB higher than the noise floor, so using the frequency domain as described herein advantageously detects the changes before hard contact occurs.

Certain embodiments described herein provide advantages as compared to existing techniques. For example, certain embodiments described herein advantageously provide detection of near-contact at all skew angles, including zero. In contrast, the standard position error system (PES) method does not work at zero skew and only detects hard touchdowns.

Figure 7:
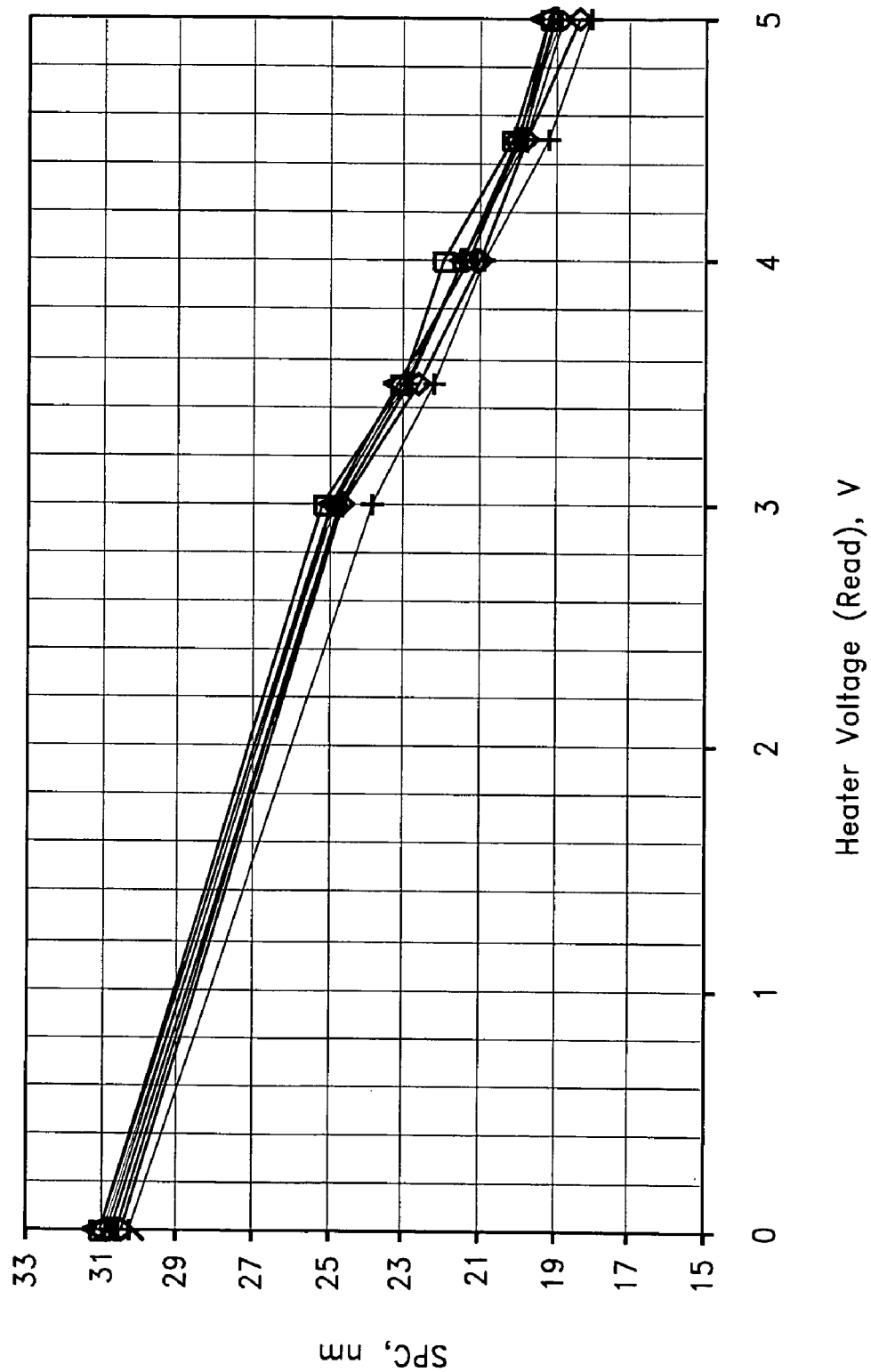
FIG. 7 is a graph of the spacing between the head and the rotating disk versus heater voltage for the measurements of the example HGA of FIG. 6.

FIG. 7 is a graph of the spacing between the head 30 and the rotating disk 20 versus heater voltage for the measurements from the example HGA of FIG. 6. The data of FIG. 7 were obtained using the standard head media spacing (HMS) method which measures the average spacing and is not sensitive to oscillations. As shown in FIG. 7, the HMS method does not indicate contact (or touchdown) between the head 30 and the rotating disk 20 even at heater voltages of 5 volts. A comparison of FIG. 7 with FIG. 6 illustrates that certain embodiments described herein are sufficiently sensitive to advantageously provide an indication of near-contact before such near-contact is detected by standard methods. Thus, certain embodiments described herein advantageously detect pre-touchdown without damage to either the head 30 or the rotating disk 20, as compared to other methods which only detect hard touchdown or contact between the head 30 and rotating disk 20.

Figure 8:
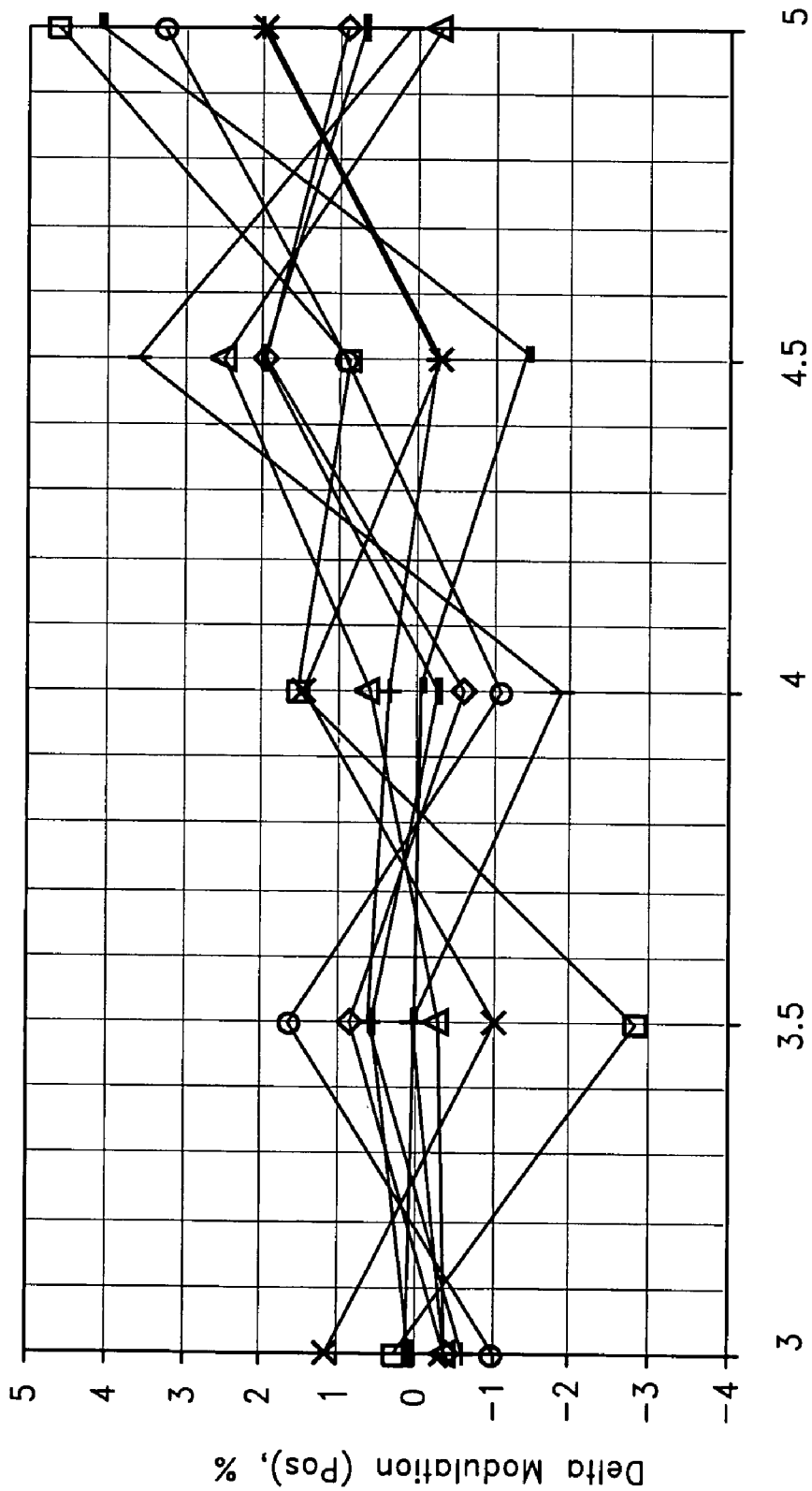
FIG. 8 is a graph of the measured modulation of the envelope in the time domain versus heater voltage for the measurements from the example HGA of FIG. 6.

FIG. 8 is a graph of the measured modulation of the envelope in the time domain versus heater voltage for the measurements from the example HGA of FIG. 6. The modulation of the envelope varies significantly among the various runs and iterations because the noise signal is a significant fraction of the modulation measurements in the time domain. The results of FIG. 8 are not very repeatable and there is no indication of contact even at a heater voltage of 5 volts. A comparison of FIG. 8 with FIG. 6 illustrates that certain embodiments described herein are sufficiently repeatable to advantageously provide a reliable indication of near-contact and are relatively easy to detect due to the good signal-to-noise ratio of the side harmonic peaks in the frequency domain.

Certain embodiments described herein advantageously provide a method to detect the near-contact condition while using relatively inexpensive testing equipment to monitor the head 30 in situ within a disk drive that has been at least partially assembled. In contrast, laser doppler vibrometry typically utilizes relatively expensive equipment and requires that the disk drive 10 be opened sufficiently to allow a laser beam to reflect from the head 30. Therefore, certain embodiments described herein can be used with fully-assembled disk drives 10 (e.g., for production-level testing). In certain embodiments, the determination of the heater voltage corresponding to near-contact is automated.

Certain embodiments described herein advantageously provide a method to detect the near-contact condition by calculating the Fourier transform of the read-back signal in software (e.g., by using fast Fourier transform algorithms). Since the frequency of the envelope modulations is in the range of tens to hundreds of kHz, sampling of the read-back signal can be performed at low repetition rates or speeds. In contrast, various existing techniques which detect frequency modulation must be done in hardware since the carrier frequency of the read-back signal is in the range of hundreds of MHz and the sampling of the read-back signal must be performed at high repetition rates or speeds.

What is claimed is:

1. A method of monitoring operation of a disk drive, the method comprising:
   providing a disk drive comprising a rotating disk and a head having a read transducer in proximity to a surface of the disk and an adjustment mechanism which controllably adjusts an average relative spacing between the read transducer and the surface;
   generating a read-back signal by reading from the surface using the read transducer, the read-back signal comprising a high frequency carrier signal having an envelope that is modulated by a lower frequency signal;
   varying the average relative spacing between the read transducer and the surface using the adjustment mechanism; and
   while varying the average relative spacing, analyzing the envelope in the frequency domain and detecting an emergence resulting from the variation of the average relative spacing of at least one frequency component of the envelope within an air bearing resonance range of frequencies.

2. The method of claim 1, wherein the air bearing resonance range of frequencies is between about 50 kHz and about 500 kHz.

3. The method of claim 1, wherein the emergence is defined to be between approximately 10 dB and approximately 20 dB above a noise level in the frequency domain.

4. The method of claim 1, wherein the operation of the disk drive is monitored in situ within a disk drive that has been at least partially assembled.

5. The method of claim 1, wherein the analyzing comprises using a spectrum analyzer.

6. The method of claim 1, wherein the analyzing comprises calculating a Fourier transform of the envelope.

7. The method of claim 1, wherein the envelope is indicative of vibrations of the head that have a component in a generally perpendicular direction relative to the rotating disk.

8. The method of claim 1, wherein the adjustment mechanism comprises a resistive heating element configured to heat at least a portion of the head.

9. The method of claim 1, further comprising avoiding contact between the rotating disk and the head.

10. The method of claim 9, wherein contact is avoided on a spinstand that is also used for dynamic electrical testing of the disk drive.

11. The method of claim 1, wherein emergence corresponds to an amplitude of the at least one frequency component above a noise level in the frequency domain with decreasing flying height.

12. The method of claim 1, wherein the emergence corresponds to near-contact between the rotating disk and the head prior to actual contact between the rotating disk and the head.

13. The method of claim 1, wherein the emergence is detected prior to contact between the rotating disk and the head.

14. The method of claim 1, further comprising using the emergence to avoid contact between the rotating disk and the head.

15. The method of claim 8, further comprising determining a near-contact height when the emergence is detected.

16. The method of claim 15, further comprising determining a maximum voltage for the resistive heating element based on the near-contact height.

17. The method of claim 16, wherein the maximum voltage is determined such that a flying height of the read transducer is no less than 2 nanometers above the near-contact height.

* * * * *